L. ARNTZ.
EYEGLASS FRAME.
APPLICATION FILED SEPT. 16, 1918.
1,370,001.
Patented Mar. 1, 1921.
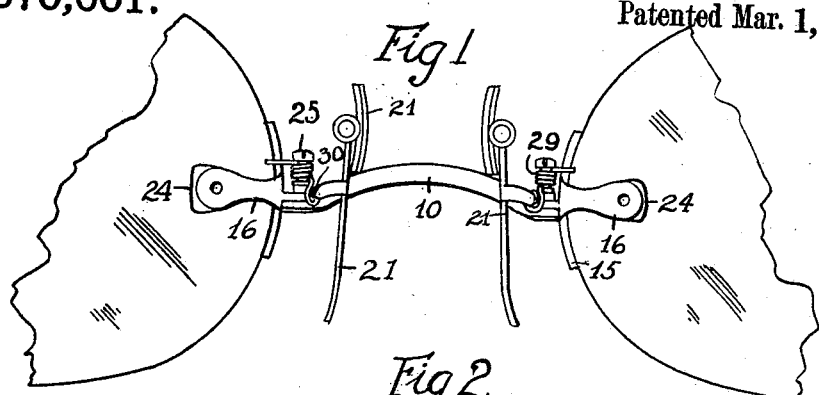
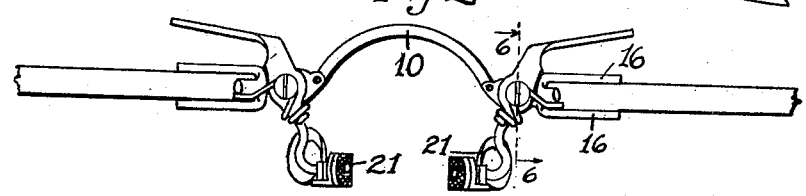
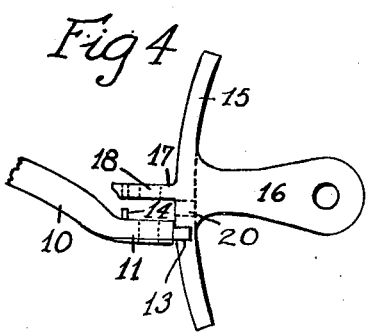
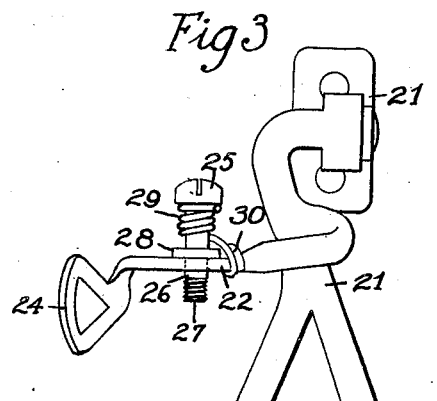
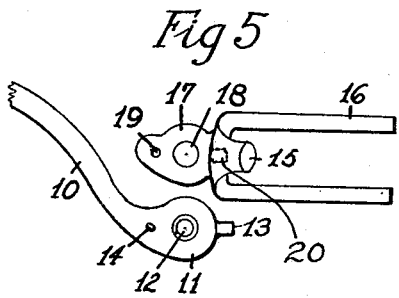
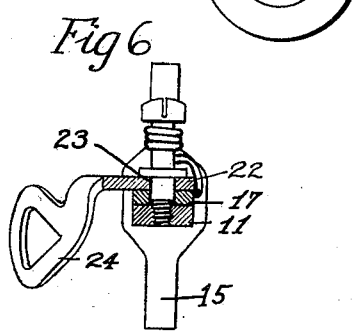
Witness
Lynn Latta
Inventor
Lew Arntz
By Arwin Barr. Attys

UNITED STATES PATENT OFFICE.

LEW ARNTZ, OF DES MOINES, IOWA.

EYEGLASS-FRAME.

1,370,001. Specification of Letters Patent. Patented Mar. 1, 1921.

Application filed September 16, 1918. Serial No. 254,332.

*To all whom it may concern:*

Be it known that I, LEW ARNTZ, a citizen of the United States, and a resident of Des Moines, in the county of Polk and State of Iowa, have invented a certain new and useful Eyeglass-Frame, of which the following is a specification.

My invention relates to frames for supporting eyeglasses.

It is well-known that bridges for eyeglasses must have a great variety of shapes and forms in order to fit the noses of the users.

The object of my invention is to provide an eyeglass frame including nose clamps, lens members, and an ear for holding the lenses, and a screw so constructed and arranged that the lens and clamp member can be mounted on the screw and held in assembled position, and the parts just mentioned may be mounted on the bridge quickly and easily, so that the bridge may be made and held in stock in a great variety of shapes and sizes while the other parts may be kept in stock in standard sizes.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a front elevation of an eyeglass frame embodying my invention.

Fig. 2 shows a top or plan view of the same.

Fig. 3 shows an enlarged, detail view of the screw with the lever and nose clamp installed thereon, and held thereon by means of the spring.

Fig. 4 shows an enlarged, detail view of the brace and bridge in position just before they are assembled.

Fig. 5 shows an enlarged, detail view of the same parts as those shown in Fig. 4, shown at right-angles to the view shown in Fig. 4; and Fig. 6 shows a detail sectional view taken on the line 6—6 of Fig. 2.

In the accompanying drawings I have used the reference numeral 10 to indicate generally the central portion of the bridge, which central portion fits over the nose.

This portion of the eyeglass frame must be kept in stock by those who furnish eyeglasses in a great variety of shapes and forms.

In the form of eyeglass frames or mountings now common in use there is secured to the bridge and formed integral therewith a brace having ears designed to be secured to the lens. It is obvious, therefore, that where the braces and bridges are integral it is necessary to keep in stock braces for forming a part of every bridge, and it is, therefore, necessary to keep in stock many more braces than is necessary.

It is quite frequently the custom to keep on hand a large stock of the entire assembled frames or mountings.

In my invention I provide the bridges detached from the other parts of the frame, so that the braces can be kept in stock in a variety of styles, and the other parts may be kept in standard shapes and sizes so that it is not necessary to keep on hand such a large stock of the other parts.

Each of the bridges 10 has at each end a flat end extension 11 having a central vertical opening 12, and having a laterally extending pin or tongue 13. Spaced from the opening 12 is preferably an upwardly extending pin 14.

For use with bridges of the kind herein described, I preferably provide braces 15 having extending away therefrom the pairs of spaced ears 16 which receive between them and are secured to the lenses.

On each brace is a laterally extending flat member 17 designed to fit adjacent to the member 11 and having an opening 18 which can be placed in position registering with the opening 12. In each portion 17 is an opening 19 adapted, when the parts are assembled, to receive the pin 14.

In each brace 15 is an opening such as that shown by the dotted lines in Fig. 4, designed, when the parts are assembled, to receive the pin or tongue 13.

Near each end of each bridge there is provided the ordinary nose clamp member 21 which may be of any suitable form having the laterally extending flat faced arm 22 provided with an opening 23 and having formed thereon the finger lever 24.

I provide for each end of the frame a screw 25 having the head as shown and having a smooth portion 26 and a screw-threaded end 27.

On the smooth portion 26 is a collar or annular member 28. Mounted on the upper portion of the screw between the head and the collar 28 is the coil spring 29. The smooth portion 26 is inserted through the opening 23 in the arm 22, as illustrated in Fig. 3, with said arm 22 fitting snugly against the collar 28.

One end of the spring 29 is secured to the arm 22, as at 30 in Fig. 3, so that the spring 29 serves the double purpose of affording tension for holding the nose clamps in proper position with relation to the other parts, and also for preventing the removal of the arm 22 from the screw.

The lower part of the smooth portion 26 is inserted through the opening 18 in the flat member 17 on the brace 15, and the parts are designed to fit snugly together, so that they will be held together when they are once assembled.

Thus the parts hereinbefore described can be assembled and held together against any accidental removal, or by ordinary slight jars until they are assembled on the bridge.

In the final assembling of the parts the screw is moved upwardly somewhat and the tongue member 13 is inserted into the opening 20 and the tongue 14 is inserted into the opening 19 by springing the parts slightly, whereupon the opening 12, which is screw-threaded, will register with the lower end of the screw and with the openings 18 and 23.

The screw-threaded portion 27 of the screw may then be screwed into the opening 12, whereupon the parts will be firmly locked.

It will be seen that the parts when once assembled operate substantially in the same way as the ordinary parts commonly in use as far as the general use of the eyeglasses is concerned.

Where my improved frame is employed it is possible to keep in stock a great variety of bridge members 10, so that a customer may be fitted without any extensive bending or shaping of the members 10 while only a comparatively small stock of the other parts of the frame may be kept on hand.

It is desirable in the eyeglass business to keep on hand a large stock of bridges, for the reason that while the bridges can be bent to different shapes, it is difficult to accomplish the bending accurately and the bending tends to break or weaken the bridges, particularly if the bending is for the purpose of fitting unusual noses or is repeated to secure a proper and accurate fit.

It will be noted that on account of the structure herein shown, when the parts are assembled, the bridge and the braces will be rigidly connected, so that the nose clamp members may be easily adjusted while the bridge and lenses will be held rigidly in proper positions relative to each other. It will also be noted that the screw 25 will hold the extension 17 and clamp member in assembled position when the bridge member is removed.

The parts may be disassembled from one bridge and assembled on another in a very short time, applicant having accomplished this in twenty seconds.

Some changes may be made in the construction and arrangement of the parts of my device without departing from the essential features and purposes of my invention, and it is my intention to cover by the claim any modified forms of structure or use of mechanical equivalents which may be reasonably included within their scope.

I claim as my invention:

In an eyeglass frame, a brace having spaced ears extending away therefrom, a laterally extending substantially flat member having an opening therethrough and having a second opening therein, a recess in said brace near said laterally extending member, a bridge having at its end a flat surfaced extension adapted to fit against said laterally extending member, and having at the end of said extension a reduced portion, said extension having a pin thereon, the parts being of sufficient resiliency to permit said reduced portion to be received in said recess in the brace and to permit said pin to be received in the second opening in said laterally extending member, so that the parts may be held together temporarily by friction.

Des Moines, Iowa, August 23, 1918.

LEW ARNTZ.